INVENTOR.
Edson A. Hoffmann.
BY
Wood, Herron & Evans.
ATTORNEYS.

May 26, 1959 — E. A. HOFFMANN — 2,888,099
CHAIR LIFT

Filed April 26, 1955 — 10 Sheets-Sheet 3

INVENTOR.
Edson A. Hoffmann
BY Wood, Herron & Evans.
ATTORNEYS.

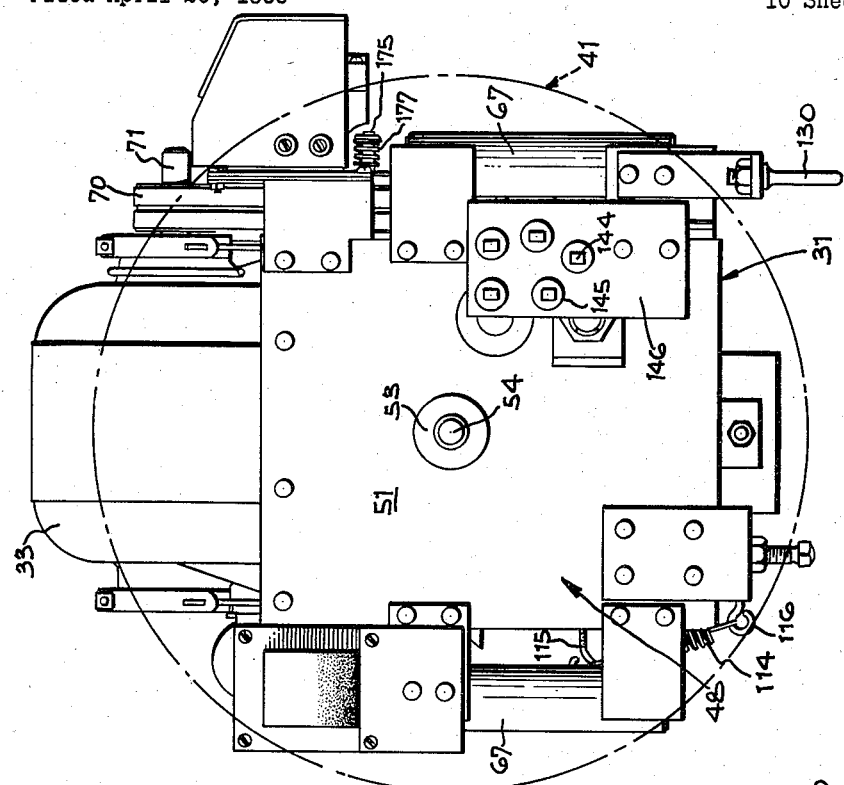
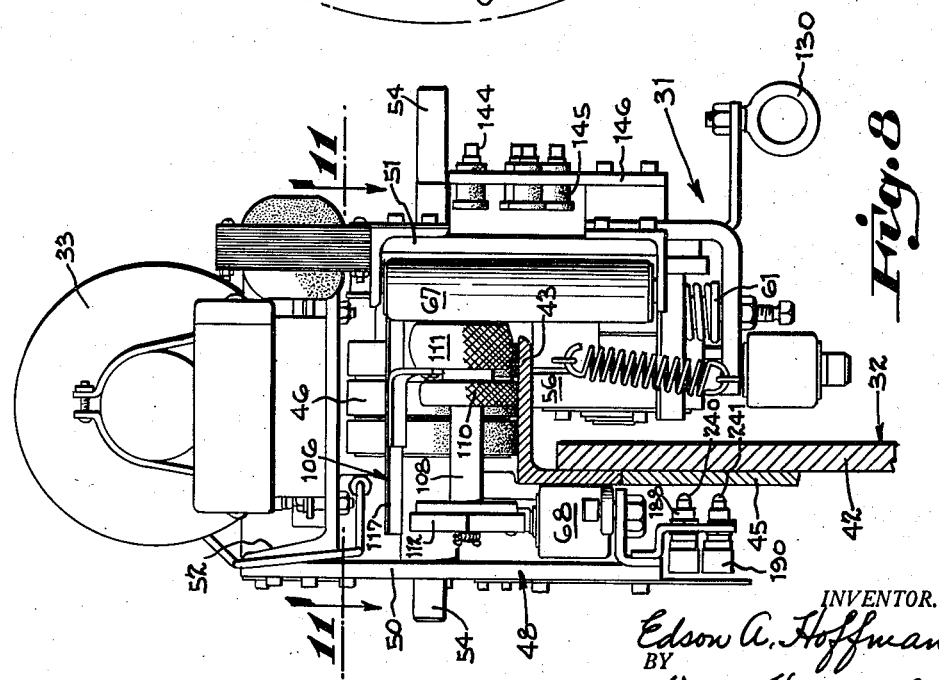

May 26, 1959　　　E. A. HOFFMANN　　　2,888,099
CHAIR LIFT
Filed April 26, 1955　　　　　　　　　　10 Sheets-Sheet 5
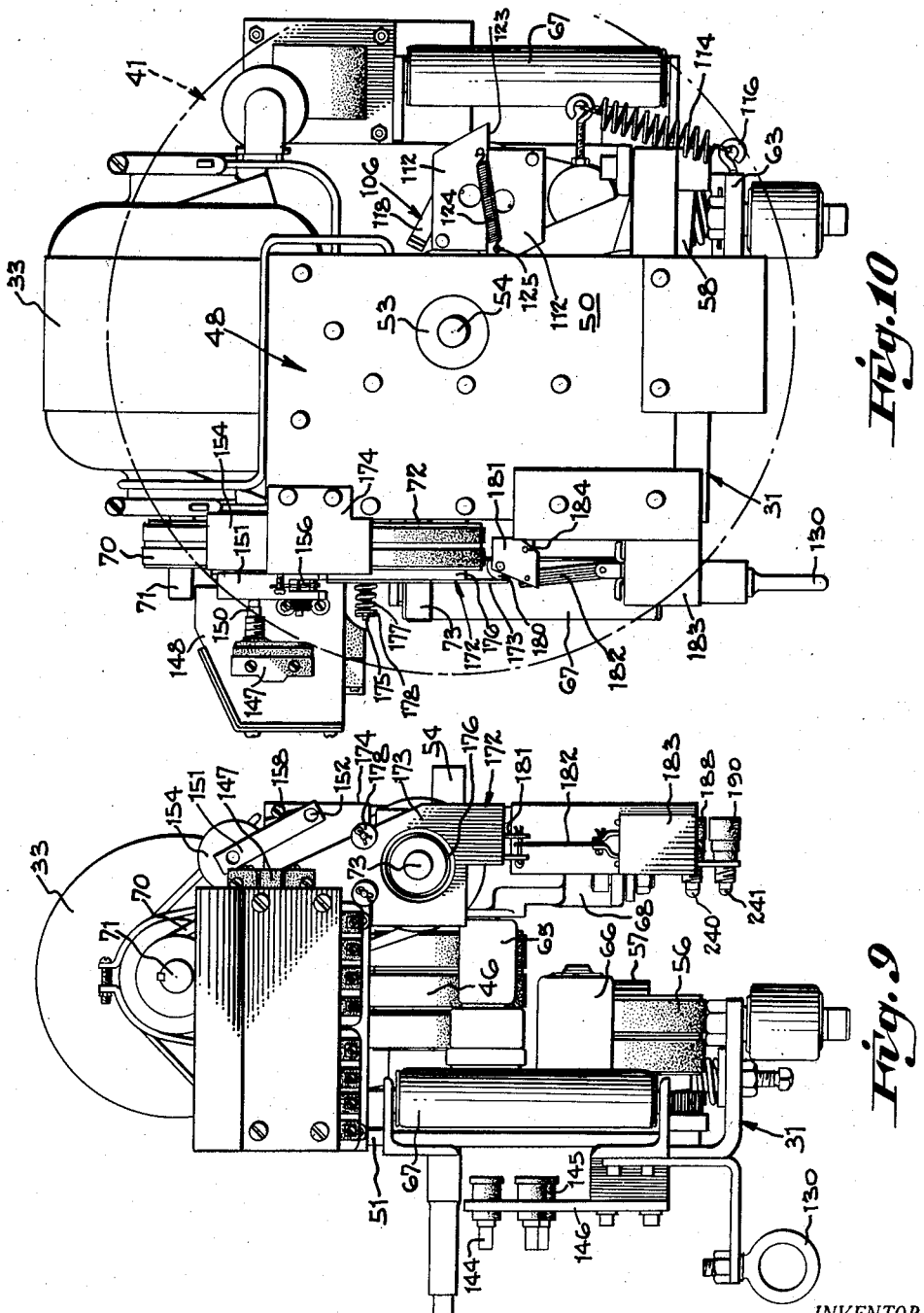
INVENTOR.
Edson A. Hoffmann.
BY
Wood, Herron & Evans.
ATTORNEYS.

May 26, 1959     E. A. HOFFMANN     2,888,099
CHAIR LIFT

Filed April 26, 1955     10 Sheets-Sheet 6

INVENTOR.
Edson A. Hoffmann
BY
Wood, Herron & Evans
ATTORNEYS.

May 26, 1959  E. A. HOFFMANN  2,888,099
CHAIR LIFT
Filed April 26, 1955  10 Sheets-Sheet 7

INVENTOR.
Edson A. Hoffmann
BY
Wood, Herron & Evans,
ATTORNEYS.

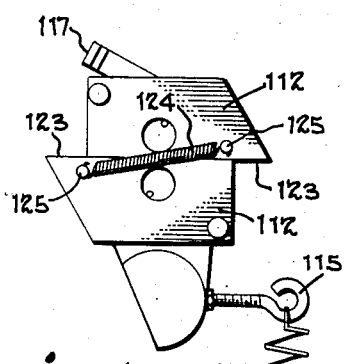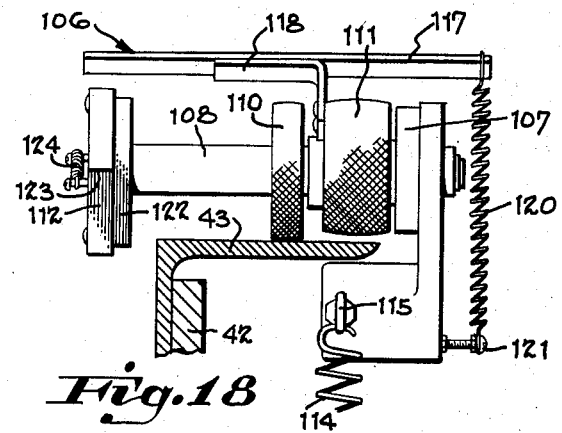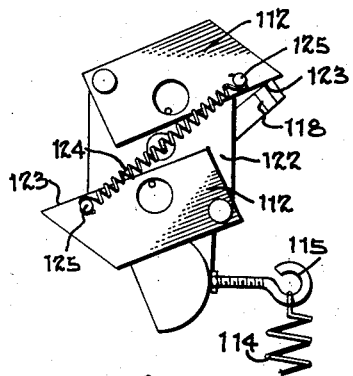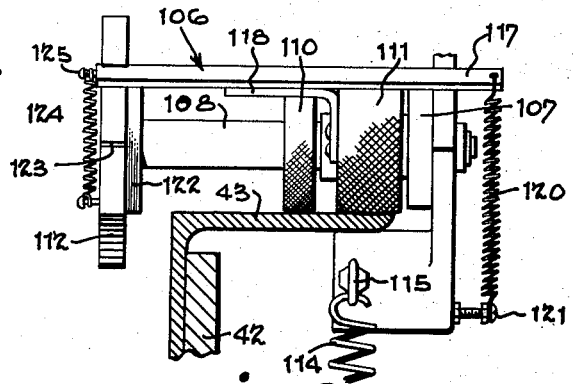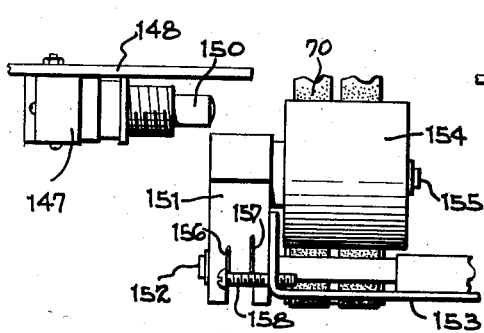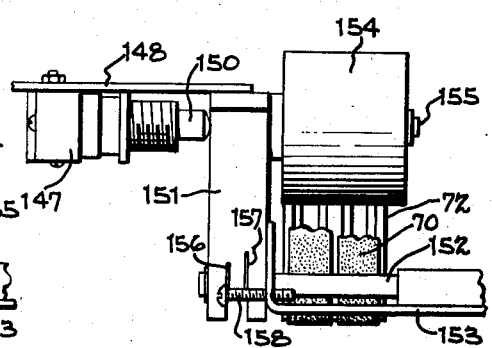

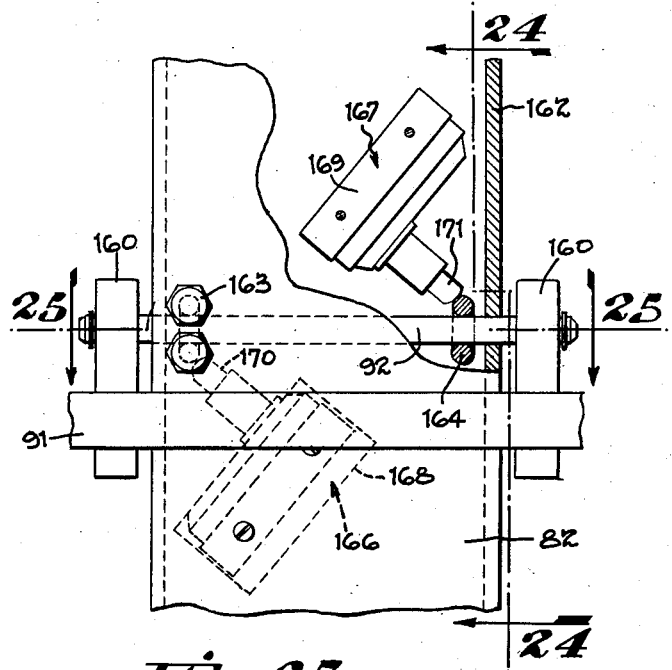
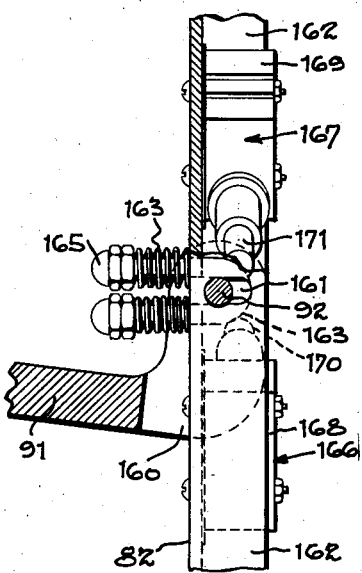
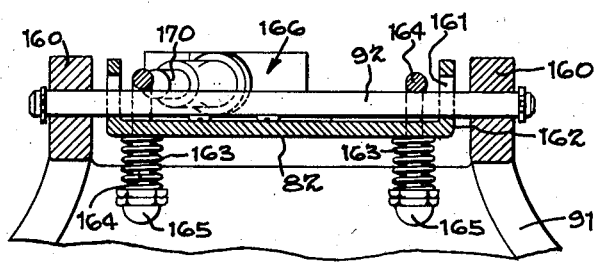

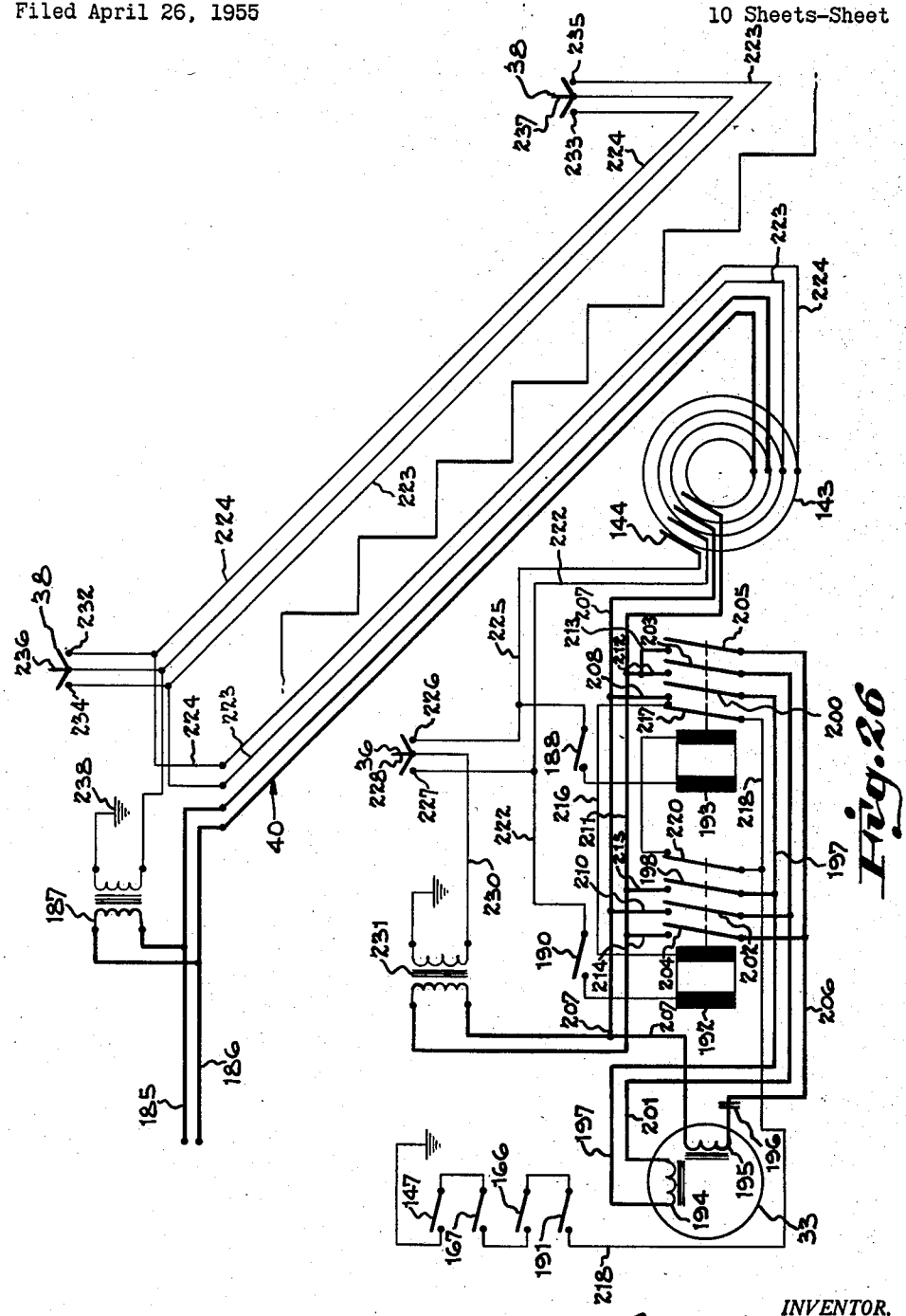

United States Patent Office 2,888,099
Patented May 26, 1959

2,888,099

CHAIR LIFT

Edson A. Hoffmann, Fort Thomas, Ky., assignor to Shepard Warner Elevator Company, a corporation of Ohio Application April 26, 1955, Serial No. 503,876

7 Claims. (Cl. 187—12)

The present invention relates to elevators and is particularly directed to an elevator of the type known as chair lifts or stair climbers.

In the past, it has been proposed to provide elevators, especially adapted for home use, of the type in which a carriage runs along an inclined rail mounted adjacent to a wall of a stairway. The carriage is provided with a seat on which a person sits while being transported from floor to floor. This general type of elevator construction is particularly advantageous for home use since it does not require any appreciable alteration of the building so that the elevator can be installed at a moderate price.

The present invention is directed to a stair climber of this general type which is adapted to provide smooth, safe transportation from one floor to another. One of the principal advantages of the present stair climber is that it is adapted for use in homes having multiple flight stairways. That is, the present stair climber can be operated on a horizontal rail or on a rail inclined at any angle. For example, the present stair climber can be used in an installation where two floors of a building are joined by a lower flight of stairs, a landing, and an upper flight of stairs disposed at an angle to the first, and can be used where the inclination of the flights are not the same. Furthermore, the present elevator is adapted for use in installations in which the total distances traveled are appreciably greater than those which prior art stair climbers could effectively traverse.

More specifically, one preferred form of elevator constructed in accordance with the present invention is adapted to travel along a rail assembly including an upper load rail and a lower leveling rail. The elevator comprises a carriage which is supported on and driven along the load rail by resilient friction driving wheels powered by a reversible motor mounted on the carriage. The passenger seat, instead of being rigidly secured to the carriage, is pivotally mounted thereon, preferably on the same axis as the load rollers. Leveling means are provided for maintaining the seat in a true vertical position for any inclination of the rail. These means include a pair of leveling rollers rigidly connected to the seat-supporting frame and in engagement with the leveling rail. The position of the leveling rail relative to the load rail is varied in accordance with the contour and inclination of the load rail so that the leveling rollers and load rollers are always disposed at the same angle relative to the horizontal. Since the relative positions of the load rollers and leveling rollers determines the position of the seat, the seat is thereby always maintained vertical. Among the advantages of the present construction is that the chair lift can be mounted in stairways having any number of flights of any inclination. A passenger remains perfectly erect no matter how the inclination of the rails changes. Furthermore, the resilient wheels provide an extremely smooth ride even if the various sections of rail are not accurately fitted together.

Another object of the present invention is to provide a novel reel for storing the electric cable by means of which electric power is supplied to the motor mounted on the carriage. According to the present invention, one end of the cable is rigidly secured adjacent to the top end of the rail while the cable itself passes along the inside of the rail to the carriage where it is wound upon a driven reel. The reel is rotatably secured to the carriage and is driven through an over-riding type of clutch and a friction clutch, in such a manner that the reel winds the cable to a predetermined tension as the carriage is driven up the rail. When the carriage is driven down the rail, the over-riding clutch is disengaged so that the cable can be paid out, a tension being applied to the cable by the friction present in the reel mounting.

One of the principal advantages of the present reel construction is that it can wind any length of cable and can maintain the cable under a constant tension. Furthermore, the reel drive is extremely compact so that the reel hub is of minimum diameter and large lengths of cable can be wound about the reel without unduly increasing its over-all size.

Another object of the present invention is to provide a novel type of governor and safety clamp which is effective to stop and hold the carriage in place in the event that any mechanical or electrical failure should cause the carriage to start down the rail at a speed in excess of a predetermined safe speed. The present governor and safety clamp includes a large eccentrically mounted, knurled gripping roller disposed for engagement with the load rail. Normally, this roller is spring-urged away from the load rail but is adapted to be brought into engagement with it by a governor-type actuator which is rotated through a driving roller in contact with the load rail and includes outwardly pivotable dogs adapted to engage an actuator bar connected to the knurled roller whenever the carriage exceeds a predetermined speed. Whenever the dogs are tripped and strike the actuator, the gripping roll is brought into clamping engagement with the load rail.

One of the particular advantages of this governor construction is that it is completely independent of any parts utilized to drive the carriage so that no matter where the failure should occur, causing rapid descent of the carriage, the governor will be effective to bring the gripping wheel into contact with the rail, halting the carriage and positively holding it in place.

A still further advantage of the present construction is that the driving motor is automatically stopped in the event that a person's foot or other object should become wedged between a step or footrest, provided beneath the chair and a stair riser. Moreover, the same switches which cause the motor to be deenergized if something should become wedged against the footrest, automatically opens the motor circuit whenever a person is standing on the foot rest, thereby preventing the car from being inadvertently started in motion while a passenger is alighting.

These and other objects and advantages of the present invention will be more readily apparent from a consideration of the following detailed description of the drawings illustrating a preferred embodiment of the invention. In the drawings:

Fig. 7 is a rear view of the carriage with the chair mounting bracket and cable reel removed;

Fig. 8 is a right hand view of the carriage assembly;

Fig. 9 is a left hand view of the carriage assembly;

Fig. 10 is a front view of the carriage assembly with the foot rest and chair mounting bracket removed;

Fig. 17 is an end view of the governor unit in its normal operating or cocked position;

Fig. 18 is a front view of the governor unit in its normal operating position;

Fig. 19 is an end view similar to Fig. 17 showing the governor dogs in a tripped position;

Fig. 20 is a front view similar to Fig. 18 showing the governor in its tripped position;

Fig. 21 is a front view of the belt tension switch in its normal operating position;

Fig. 22 is a view of the belt tension switch in its tripped position;

Fig. 23 is a front view of the foot rest mounting bracket and the seat frame bracket, the bracket being partially broken away to show the foot rest safety switches;

Fig. 24 is a cross-sectional view taken along line 24—24 of Fig. 23;

Fig. 25 is a cross-sectional view taken along line 25—25 of Fig. 23; and

Fig. 26 is a schematic circuit diagram of the power circuit and safety devices of the stair climber.

Figure 1:
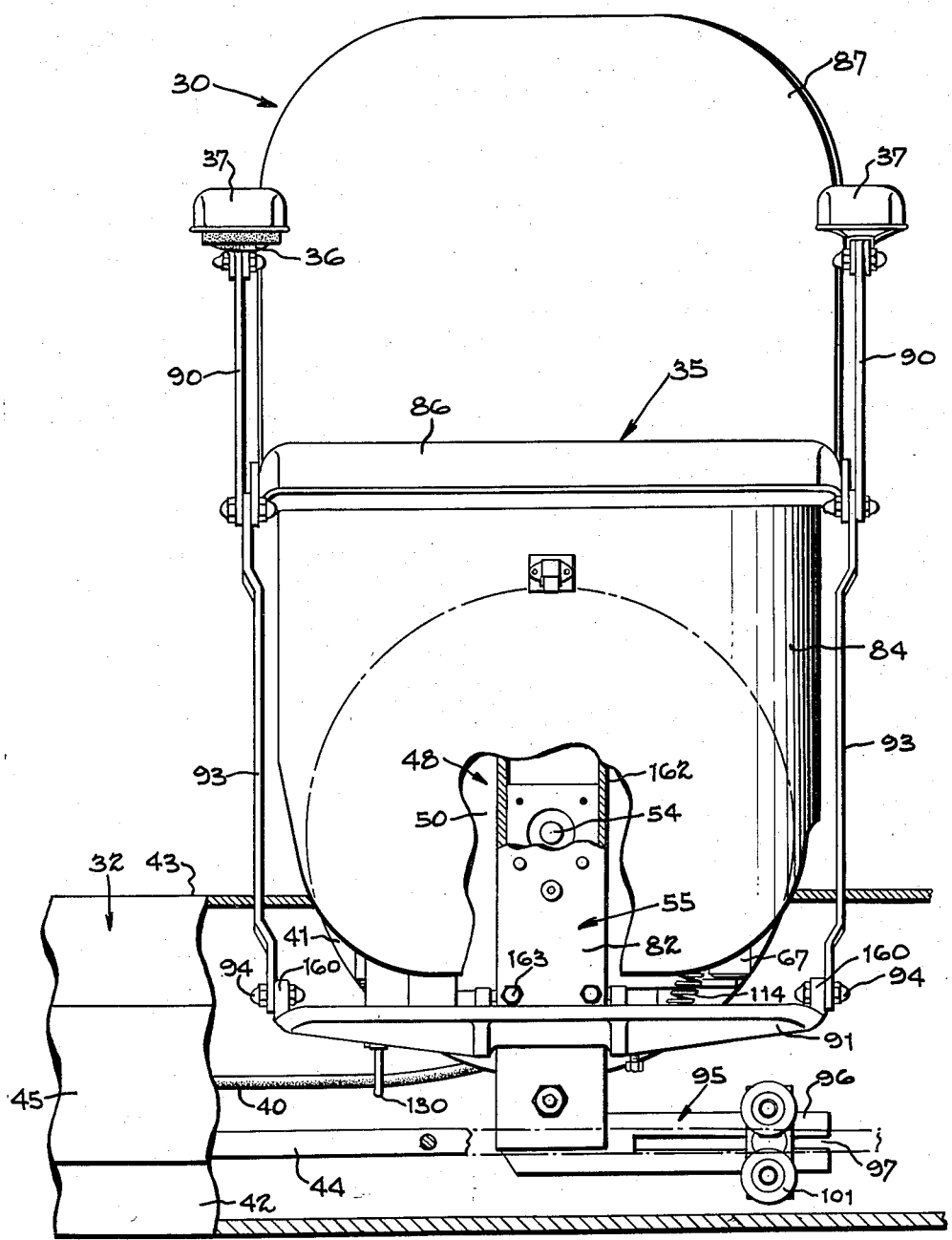
Fig. 1 is a front elevational view of a chair lift constructed in accordance with the present invention.

As shown in Figs. 1 to 4, a stair climber, or chair lift 30 constructed in accordance with the present invention is adapted to transport an individual from one floor of a building to another. The chair lift includes a carriage 31 which is tracked upon a rail assembly 32 mounted at one side of a staircase. The chair is driven along the rail assembly by means of a motor 33 and a friction drive indicated generally at 34.

A chair 35 is pivotally mounted upon carriage 31 and is provided with leveling means for maintaining the chair in a vertical position for any inclination of the rail. In most installations, the chair back is adjacent to and spaced slightly from a staircase wall so that a passenger seated in the chair faces across the stairs as he is lifted or lowered. When not in use, the chair is adapted to be folded to the position shown in dotted lines in Fig. 2 so that the staircase is unobstructed for normal use.

Motor 33 is a reversible electric motor and its operation is controlled by a direction button 36 mounted on arm 37 of the chair and by call switches 38 mounted adjacent to the ends of the rail at the upper and lower floors. The operation of motor 33 is also controlled by a plurality of safety switches which are described in detail in conjunction with the description of Fig. 26. Electric power is supplied to the motor and safety switches through a cable 40 which is permanently secured adjacent to the top end of the rail and passes downwardly inside of the rail to a cable reel 41 rotatably mounted on the rear end of the carriage.

More particularly, rail assembly 32 includes a main rail 42 which is preferably in the form of a heavy angle iron. This angle iron is bolted or otherwise secured to a stairway or to a landing or floor of a hallway not shown. It is to be understood that the main rail may be formed from a single length of stock, or, as in the preferred form, a plurality of sections can be joined together in any suitable manner. The present chair climber construction is such that the rail can be disposed horizontally or at any inclination and can include any desired form or curve when changing from one inclination to another. Also, the rail can be curved in a horizontal direction if desired.

Main rail 42 carries a load-supporting rail 43, a leveling rail 44, and a face plate 45. Load rail 43 is preferably in the form of an angle iron including a vertical arm welded or otherwise secured to the vertical leg of the main rail and a horizontal arm adapted for engagement with driving rollers 46 of the carriage. Leveling rail 44 is preferably in the form of a bar having rounded edges, the bar being supported from the inner face of the main rail by means of a plurality of mounting lugs 47 which are bolted or otherwise secured to the main rail. In the preferred embodiment, the main rail and load rail, when assembled, form a channel-shaped assembly which encloses the leveling rail and cable 40.

As best shown in Figs. 7 through 12, carriage 31 includes a frame 48 formed from heavy metal plates. Frame 48 comprises a front plate 50, a rear plate 51, and a top channel plate 52. Suitable bushings 53 are provided in the front and rear plates for receiving main shaft 54. This shaft supports upper load rollers 46 and, in addition, carries chair-supporting frame 55 and cable reel 41. Motor 33 is bolted or otherwise secured to top channel member 52.

Carriage 31 is mounted upon rail assembly 32 by means of load rollers 46 which are keyed to main shaft 54, the main shaft preferably being disposed in substantial alignment with the vertical axis of the carriage and chair. Load rollers 46 are disposed for engagement with the top surface of load rail 43. These rollers are preferably formed from a resilient, high friction material such as rubber or from a metallic core having a peripheral band of rubber. In addition to load rollers 46, carriage 31 is provided with a second driving roller 56, adapted for engagement with the under surface of load rail 43. The second load roller is also formed from a high friction material and is rotatably mounted upon shaft 57, carried by rocker arm 58, which in turn is mounted about pivot pin 60. Arm 58 is spring urged upwardly by means of a compression spring 61 to bring roller 56 into engagement with load rail 43 directly below roller 46. This spring fits over a lug 62 carried by flange 63 formed on rear frame member 51 and is compressed between flange 63 and a flange 64 formed on arm 58.

In addition to the driving rollers, carriage 31 is provided with auxiliary stabilizing rollers 65 and 66 adapted to engage upper and lower surfaces of load rail 43, and vertical guide rollers 67 adapted for engagement with the inner edge of the load rail; guide rollers 68 adapted for engagement with face plate 45 and the vertical face of the load rail. These rollers, together with the driving rollers 46 and 56, support the carriage 31 so that it is adapted to be driven up and down along the rail but is prevented from tilting or sliding edgewise of the rail.

The drive for rollers 46 and 56 is taken from motor 33 through belts 70 in engagement with a suitable pulley disposed on motor shaft 71. The belts are also in engagement with a pulley 72 mounted on shaft 73 of gear reduction unit 74. Shaft 73 carries a worm gear 75 which in turn meshes with a gear 76 carried by cross shaft 77 which is rotatably journaled in front and rear plates of frame carriage 48. Cross shaft 77 carries spur gear 78 which meshes with gear 80 of main shaft 54 and gear 81 rotatably mounted upon pin 60. Load rollers 46 are driven by the rotation of main shaft 54 while rollers 56 are driven through gear 81 which meshes with a spur gear mounted on shaft 57 but not shown in the drawings.

Figure 2:
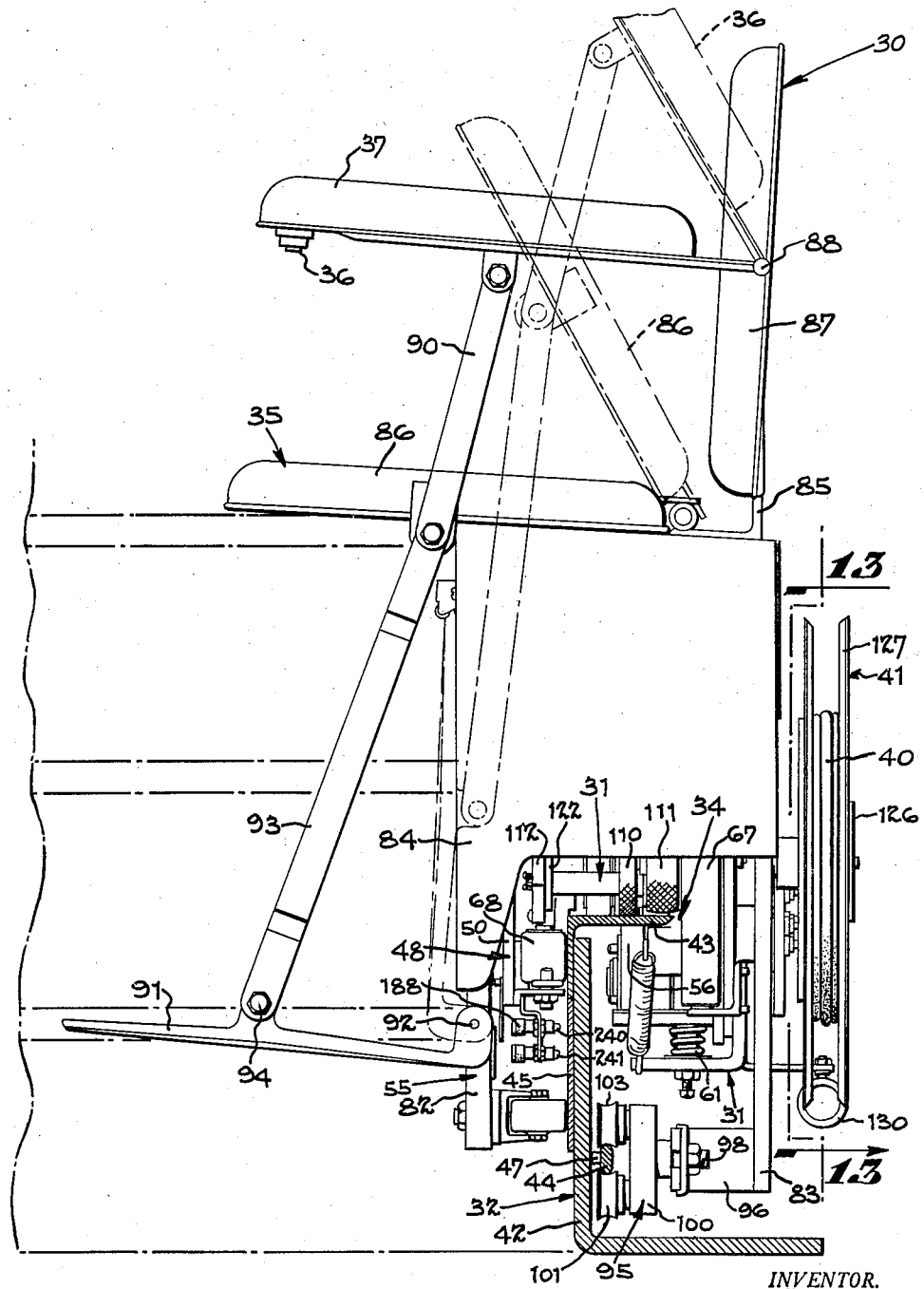
Fig. 2 is a side elevational view of the lift.
Figure 3:
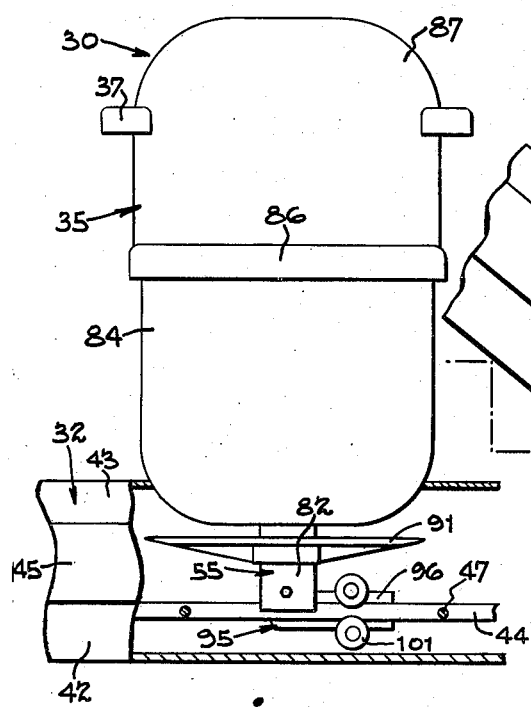
Fig. 3 is a front view partially in section showing the chair on a horizontal section of rail.
Figure 4:
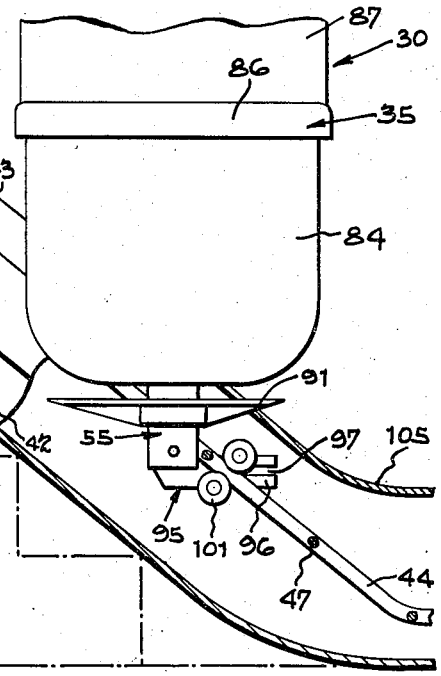
Fig. 4 is a front view similar to Fig. 3 showing the chair on an inclined section of rail.
Figure 5:
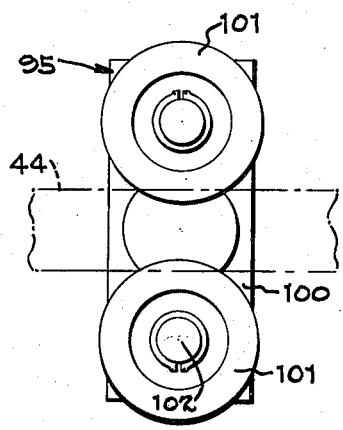
Fig. 5 is an enlarged elevational view of the leveling rollers.
Figure 6:
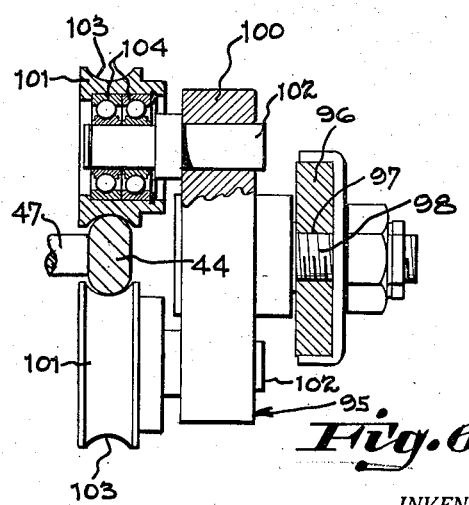
Fig. 6 is a side view of the leveling rollers partially in section.
Figure 11:
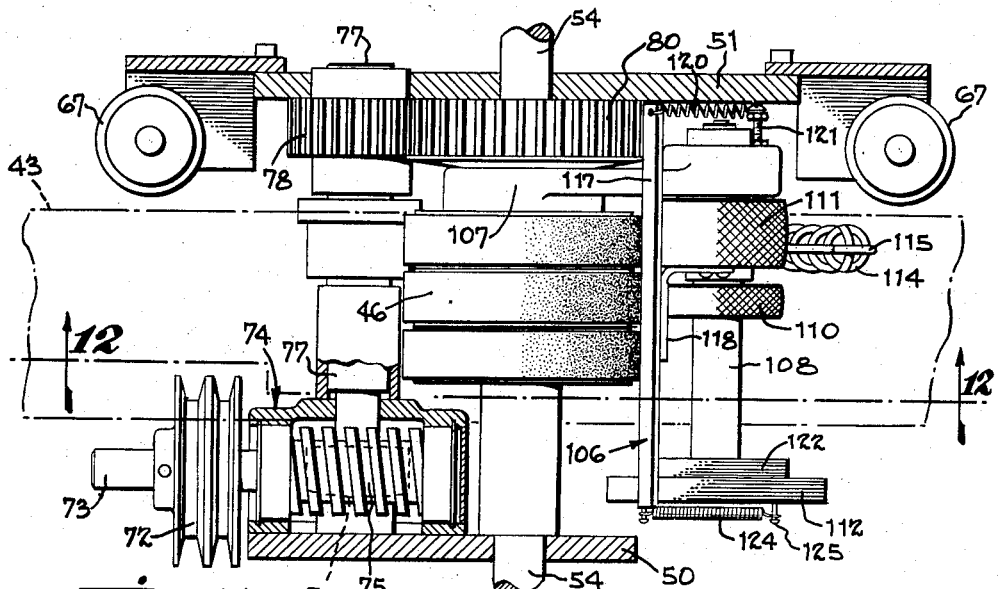
Fig. 11 is a cross-sectional view of the carriage assembly taken along line 11—11 of Fig. 8.

Chair 35 is carried by a chair-supporting frame 55 which is pivotally secured to main shaft 54. More particularly, chair-supporting frame 55 comprises front and rear vertically extending channel members 82 and 83 which are joined at the upper ends by a horizontal section. These members carry a sheet metal cover member 84 adapted to enclose the carriage, and in addition, carry angle 85 which pivotally supports chair seat 86. The chair seat is adapted to be pivoted into a horizontally extending use position, as shown in Figs. 1 and 2, or into a vertically extending storage position, as shown by dotted lines in Fig. 2. Angle member 85 also carries back member 87. Arms 37 are pivotally joined to back 87 by means of pins 88 and are connected to seat 86 by links 90. Front channel member 82 also carries a step, footrest 91 which is pivotally joined to channel member 82 by means of rod 92 and to seat 86 by links 93, the lower end of the links being loosely bolted to the footrest as at 94.

As the climber 30 travels along rail assembly 32, the engagement of load rail 43 with the driving rollers and the stabilizing rollers maintains carriage 31 parallel to the inclination of the rail assembly. However, the chair is free to pivot relative to the carriage and in accordance with the present invention is maintained in an upright position by a leveling mechanism 95. Leveling mechanism 95 includes a bracket 96 formed on the lower end of rear frame member 83. This bracket is provided with a transverse slot 97 adapted to receive bolt 98 which rotatably carries a swivel plate 100. Swivel plate 100 in turn journals two spaced leveling rollers 101. These rollers are respectively mounted on pins 102 by means of ball bearing or other anti-friction bearings 104. Each of the leveling rollers preferably has a peripheral groove 103 formed therein adapted to engage the rounded surface of leveling rail 44.

As best shown in Figs. 3 to 6, leveling rollers 101 engage opposite sides of the leveling rail, clamping the leveling rail between them. The angular position of chair 35 is determined by the angular relationship between leveling rollers 101 and main shaft 54 about which the chair frame is pivotally mounted. In accordance with the present invention, the chair is maintained in an upright position irrespective of the inclination of rail assembly 32 by varying the position of leveling rail 44 with respect to load rail 43. This can best be seen from Fig. 4, where, as the load rail shifts from a horizontal position to an inclined one through arcuate bend 105, the leveling rail is shifted from a position adjacent to the bottom of the rail assembly which it occupies when the load rail is horizontally disposed to a position close to the top of the rail assembly which it occupies when the load rail is sharply inclined. No matter what the inclination of the load rail, the leveling rail is always spaced from it so that the points of engagement of the leveling rollers with the leveling rail and the driving rollers with the load rail always bear the same angular relationship to one another with respect to the vertical.

Figure 12:
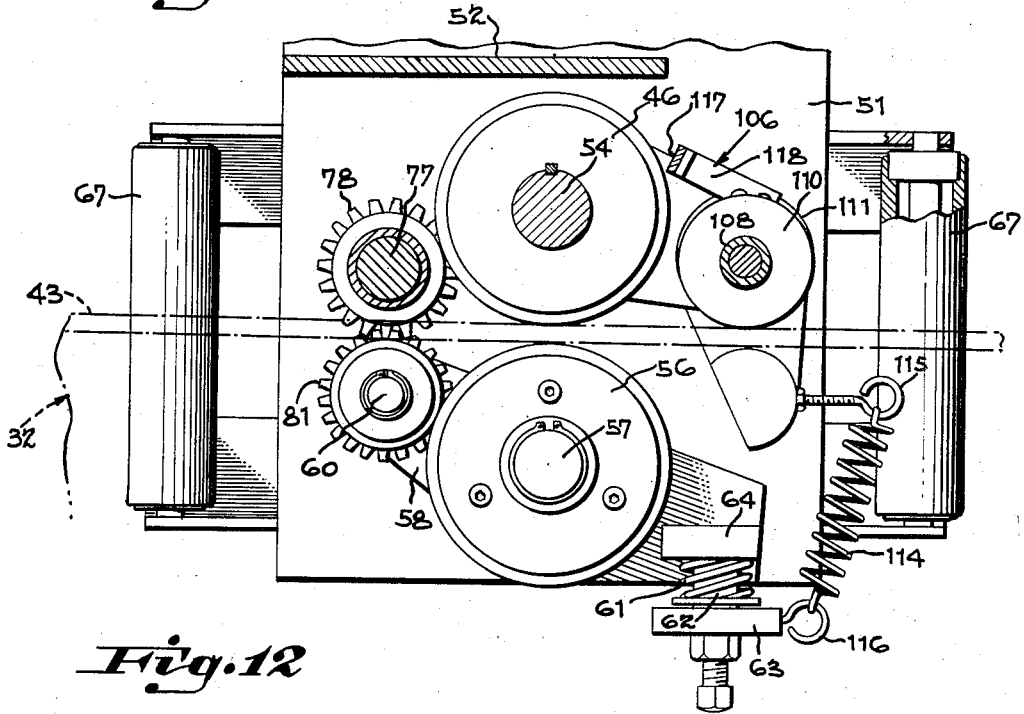
Fig. 12 is a cross-sectional view of the carriage assembly taken along line 12—12 of Fig. 11.
Figure 13:
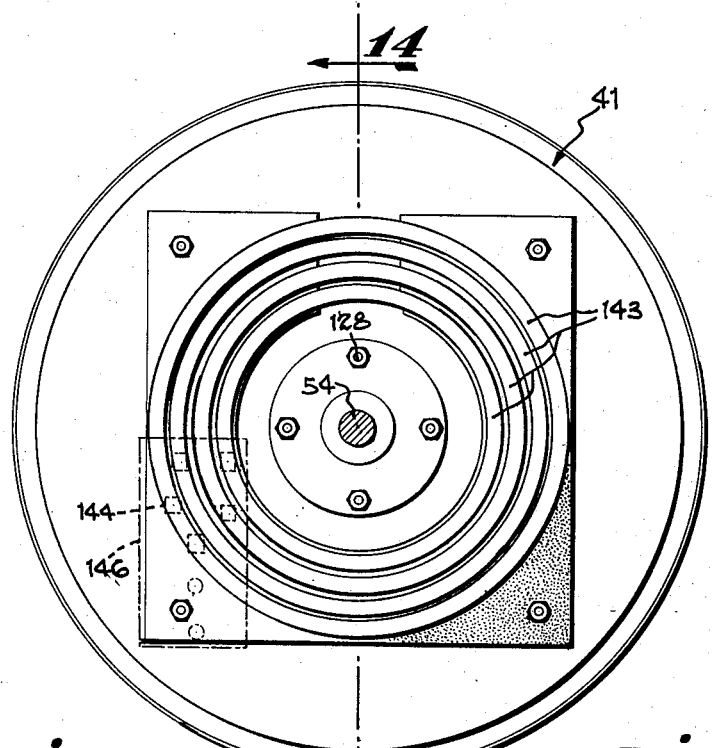
Fig. 13 is a front elevational view of the cable drum and brush rings.

The chair lift 30 is provided with an over-speed governor and safety device 106 which is best seen in Figs. 11, 12, and 17 through 20. Governor assembly 106 comprises an arm 107 rotatably mounted upon main shaft 54 intermediate gear 80 and driving wheel 46. The free end of this arm carries cross rod 108 upon which are rotatably mounted knurled driving wheel 110 and knurled clamping wheel 111. Cross shaft 108 also carries governor dogs 112. Driving wheel 110 is keyed or otherwise rigidly secured to shaft 108 while wheel 111 is freely rotatable on the shaft; wheel 110 is concentrically mounted with respect to the shaft, while gripping wheel 111 is eccentrically mounted. Arm 107 is configured to form a projection 109 adapted to engage the underside of load rail 43 while driving roller 110 engages its upper surface. As best shown in Fig. 12, arm 107 is spring-urged downwardly to hold wheel 110 in firm engagement with the top of rail 43 by means of a tension spring 114 which engages a hook 115 carried by the arm and a hook 116 carried by flange 63.

Gripping wheel 111 carries an actuator bar 117. This bar is mounted on a bracket 118, bolted or otherwise secured to wheel 111, and extends parallel to rod 108 along a line spaced outwardly from the diameter of wheels 110 and 111 and beyond dogs 112 in their normally closed position shown in Figs. 17 and 18. This arm is normally held in a cocked position as shown in Fig. 12, the cocked position always being disposed on the side of a vertical line passing through cross rod 108, corresponding to the higher end of the track assembly. Bar 117 is held in this position by means of an over-center spring arrangement including spring 120, one end of which is secured to the bar and the other end of which is secured to governor arm 107 as by means of bolt 121. So long as arm bar 117 is in its cocked position, gripping wheel 111 is spaced slightly from load rail 43.

The function of dogs 112 is to displace bar 117 to bring gripping wheel 111 into firm engagement with the load rail if the carriage should start to descend along the rail at a rate greater than a predetermined safe rate of speed. As shown, dogs 112 are pivotally secured to a plate 122 carried on the end of cross shaft 108. Each of the dogs 112 is provided with a projecting edge 123, and each of the dogs is spring-urged to a position where this projecting edge extends substantially radially from shaft 108 and describes a relatively small circle about this shaft, smaller than the distance bar 117 is spaced from that shaft. In the embodiment shown, this spring force is provided by means of spring 124 which is pinned to each of the dogs as at 125.

The centrifugal force exerted on the dogs by the rotation of drive wheel 110, shaft 108, and plate 122 causes the dogs to pivot outwardly against the spring force so that projections 123 are disposed at greater distances from shaft 108 as the speed of that shaft is increased. When the speed of shaft 108 reaches a critical limit, dogs 112 are rotated outwardly to a point where projections 123 engage bar 117, causing that bar to rotate downwardly to bring eccentrically mounted locking wheel 111 into engagement with load roller rail 43. Since wheel 111 is rigidly secured to the shaft 108 and cannot turn, it bites into the rail and brings the carriage to an abrupt halt. The carriage cannot thereafter move further down the rail even though motor 33 tends to drive it in that direction until wheel 111 and arm 117 are manually returned to their cocked position.

As indicated before, electrical power is supplied to the climber driving motor 33 through a cable 40 which is wound upon cable drum or reel 41. This cable is rigidly secured adjacent to the upper end of the rail and passes downwardly inside of the rail assembly as best shown in Figure 1. As explained in detail below, the cable carries four leads, two alternating current power leads and two low voltage control circuit leads. Reel 41 is a power reel adapted to pay out cable when the carriage moves down the rail and adapted to rewind the cable as the carriage moves up the rail. The construction of this reel is best shown in Figures 13 through 16.

Reel 41 includes a hub 126 and two circular side walls 127 secured to the hub as by means of bolts 128. Cable 40 is wound around the hub between the side walls; a guide loop 130 carried by carriage frame 48 is provided for aligning the cable with the reel. Hub 126 is pivotally joined to main shaft 54 by means of suitable bearings, such as roller bearings 131. The central area of the hub is hollowed out to provide a recess 132 adapted to receive clutch plate 133, driving member 134, cam 135, and ball carrying ring 136 adapted to position three ball bearings 137 between the driving member and cam member. Clutch plate 133 is compressed between the vertical wall of hub 126 and a wall of driving member 134 by means of a compression spring 138, which is compressed between an annular shoulder provided on the hub and a flange on sleeve 140 which is loosely fitted for sliding movement over shaft 54 and passes through an opening in clutch plate 133, an opening in driving member 134, and is provided with a groove adapted to receive a retaining ring 141 which abuts the inner edge of driving member 134, urging that member against clutch plate 133.

Cam 135 is keyed or otherwise secured to shaft 54 and is provided with three spirally configured projections 142. Cam 135 is rotated counterclockwise when the carriage is traveling down a rail and clockwise when the carriage is traveling up a rail. Cam projections 142 are configurated so that when the cam is turned clockwise, cam surfaces of gradually increasing radius are presented to the balls while when the cam is turned in a counterclockwise direction cam segments of decreasing diameter are presented to the balls; until a radial shoulder formed on each of the cam projections engages a finger provided on ball ring 136. This finger is effective to prevent the shoulder from coming into contact with ball 137.

When the carriage moves downwardly, cam 136 is turned counterclockwise and there is no cooperative engagement of the cam projections and balls 137. Cam 135 thus turns freely without dragging driving member 134 with it. Consequently, the driving member and hub are free to turn relative to shaft 54 and the cable is paid out as required; there is however sufficient friction present to maintain a tension on the cable. On the other hand, when the carriage is moving up an inclined rail, cam 135 is turned clockwise. The cam projections are thus forced against balls 137 wedging those balls between the cam projections and driving member 134. This member is thus driven along with cam 135 and in turn drives hub 126 through clutch plate 133. It will be understood that the spring tension on this clutch plate is adjusted so that the clutch will slip whenever the tension on the cable is greater than a predetermined maximum.

Figure 14:
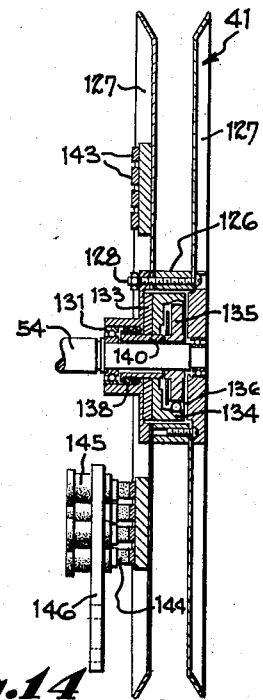
Fig. 14 is a cross-sectional view taken along line 14—14 of Fig. 13.
Figure 16:
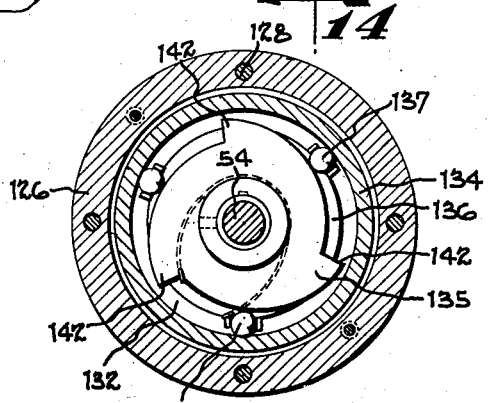
Fig. 16 is a cross-sectional view taken along line 16—16 of Fig. 15.
Figure 15:
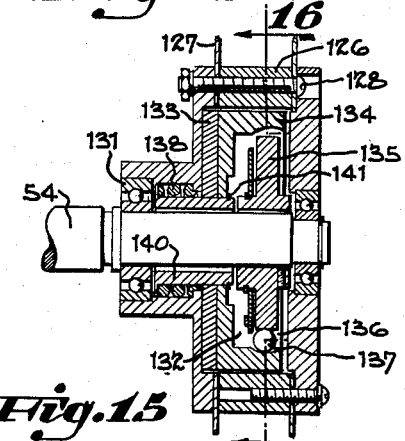
Fig. 15 is an enlarged cross-sectional view of the cable drive mechanism.

Cable 40 is brought through an opening in side wall 127 of reel 41 and each of the four leads of the cable is soldered to one of the concentric conductive rings 143 which are mounted on a sheet of insulating material, in turn secured to wall 127 of the reel. Electric contact is made with these rings by a plurality of brushes 144 as shown in Figure 14. These brushes can be of any suitable construction, one preferred form including a housing 145 carried by a plate 146 mounted upon the carriage frame. Brush housings 145 enclose a spring and a carbon contact which is urged by the spring into engagement with one of the conductive rings 143.

The stair climber is provided with a plurality of safety switches which are in circuit connection with leads from brushes 144 and motor 33. One of these switches is the belt switch 147 best shown in Figures 21 and 22. The belt switch is a snap action microswitch and is carried by a support member secured to carriage frame 48. The switch includes a housing 148 and a projecting contact actuating plunger 150. The switch is normally closed so long as contact plunger 150 is in its extended position shown in Figure 21. However, the switch is open when the plunger 150 is depressed as shown in Figure 22. Operation of plunger 150 is controlled by an actuating lever 151. This lever is pivotally secured to a rod 152 which is in turn mounted upon a plate 153 joined to an element of the carriage frame. Lever 151 carries a large roller 154 which is rotatably mounted on pin 155 and is spring urged into engagement with belts 70 by means of spring 156. Spring 156 has a coil surrounding rod 152 and extensions 157 in engagement with a bolt 158 in threaded engagement with plate 153. So long as belts 70 are under the proper tension, roller 154 spaces lever 151 from engagement with plunger 150. However, should the belt break, spring 156 urges lever 151 into engagement with the plunger, depressing that element and opening switch 147 to deenergize motor 33.

Figures 23, 24 and 25 disclose the safety switches associated with step, or footrest 91. One function of these safety switches is to prevent the energization of driving motor 33 when a passenger is standing upon the footrest of the stair climber. In addition, the switches function to automatically deenergize the motor if a person's foot or some object should inadvertently become wedged between the footrest and a stair riser.

As previously indicated, step 91 is pivotally secured to front channel 82 of the chair support frame by means of rod 92. This rod is journalled in ear-like mounting flanges 160 formed on the footrest and is adapted to pass through elongated openings 161 formed in channel member 82. These channel openings extend from front to rear in side walls 162 of the channel member. Rod 92 is urged forwardly against the front edge of the slots by means of compression springs 163 carried on mounting members 164 and compressed between nuts 165 provided on the end of the mounting rods and the front wall of channel member 82. Mounting members 164 are preferably constituted by bolts of a U-shaped configuration, the closed end of the U embracing pivot rod 92.

These U-shaped mounting members not only function to urge rod 92 forwardly, but in addition function as switch actuators adapted to trip step safety switches 166 and 167. As best shown in Figure 23, these switches are snap action microswitches and include housings 168 and 169 which are bolted or otherwise secured to the inner surface of frame member 82. Each of the switches also includes a contact actuating finger 170, 171 which is oriented at a 45 degree angle with respect to rod 92. The switches are mounted relative to members 164 so that the end of switch fingers 170 just contacts the arcuate end of each of the rods when the rod is in its forward position as shown in Figure 25.

When a person stands upon step 91, rod 92 is shifted rearwardly within slots 161 carrying with it mounting bolts 164. These members force switch actuating plungers 170, 171 inwardly to open normally closed switches 166 and 167. These switches prevent the energization of the motor so long as a passenger is standing upon the footstep. Similarly, if either edge of step 91 should engage an obstruction as the chair goes up or down the stairway, step 91 will be canted about a vertical axis so that either the right or left hand end of rod 92 will be forced rearwardly toward the end of an elongated slot in member 82. This will cause switch 166 or 167 to be opened and thereby stopping the operation of motor 33.

The carriage is provided with a brake indicated generally at 172 for stopping the carriage and holding it stationary whenever the motor is de-energized. Before describing the brake in detail, it should be pointed out that the pitch of worm gear 75 in gear reduction unit 74 is such that it tends to prevent rotation of cross shaft 77 and main shaft 54 when the motor is not in operation. However, to provide a greater frictional force for positively preventing movement of the carriage when the motor is de-energized, a friction brake 172 is provided for retarding rotation of shaft 73 of the gear reduction unit.

As best shown in Figures 9 and 10, brake 172 includes a plate 173 which is loosely secured to bracket 174 carried by the carriage frame. Plate 173 is mounted upon three bolts 175, the bolts passing through enlarged openings in the plate. The plate carries a friction block 176 formed of some material having a high coefficient of friction such as fiber-board asbestos or the like. Plate 173 is spring urged inwardly by means of springs 177 which are mounted over bolts 175 and are compressed between plate 173 and caps 178 secured to the ends of the bolts. The lower end of plate 173 is disposed for engagement with roller 180 carried by a pivotally mounted bracket 181 joined to the front member of carriage 31. Bracket 181 is connected through link 182 to an armature of solenoid 183. This solenoid is in circuit connection with the motor field windings so that whenever the motor is energized the solenoid is actuated. When the solenoid is energized its armature is forced downwardly so that roller 180 engages bracket 181 urging that bracket to pivot outwardly about pin 184 forcing friction block 176 away from engagement with the pulley carried by shaft 73. This frees that shaft to turn under the torque applied by the motor through belt 70.

Figure 26 shows the electrical circuit diagram for the stair climber, the various conductors employed have been omitted from the other views for sake of clarity. As shown in Figure 26 power for the unit is obtained through power lines 185 and 186. These power lines form two leads of cable 40, the ends of these cable leads being soldered to conductive rings 143 as explained above. In addition to the 110 volt power lines the system also uses a 24 volt control which is obtained through step-down transformer 187 connected across power lines 185 and 186. The control circuit includes two call switches 38 disposed at the upper and lower termini of the chair travel, a direction button 36 mounted on an arm of the chair, normally closed limit switches 188 and 190 mounted on carriage 31 and adapted to be opened by engagement with lugs disposed at the ends of the rail assembly, and a group of series-connected safety switches including belt switch 147, footrest switches 166 and 167 and a motor overload switch 191. The control circuit directly governs the energization of up relay 192 and down relay 193 which in turn controls the energization of motor 33.

More particularly, motor 33 includes two windings 194 and 195, winding 195 being series connected with starting capacitor 196. One lead of winding 194 is connected through line 197 to contact 198 of up relay 192 and contact 200 of down relay 193. The other end of this winding is connected through lead 201 to contact 202 of up relay 192 and contact 203 of down relay 193. In a similar manner one end of motor winding 195 is connected to contact 204 of the up relay and to contact 205 of the down relay through conductor 206. The other end of this winding is connected to line 207 which is joined to brush 144 in engagement with the second ring to which line 185 is soldered. Line 207 is also joined to stationary contact 208 of down relay 193 and contact 210 of up relay 192. A second power lead 211 is connected through a brush 144 to the inner ring which is soldered to power line 186. Line 211 is joined to contacts 212 and 213 of down relay 193 and to contacts 214 and 215 of up relay 192. When up relay 192 is energized windings 194 and 195 are energized to drive armature of motor 33 in one direction and when down relay 193 is energized the phase relationship of the current supplied to winding 194 is reversed so that motor 33 is driven in the opposite direction. Thus, when up relay 192 is energized lead 197 is connected to power line 186 and lead 201 is connected to power line 185. On the other hand when down relay 193 is energized lead 197 is connected to power line 185 and lead 201 is connected to power line 186.

One lead of the coil of up relay 192 is connected to ground through lead 216, normally closed contact 217 of the down relay, lead 218, and safety switches 191, 166, 167 and 147. Similarly, one lead of the coil of down relay 193 is connected to ground through normally closed contact 220 of up relay 192, lead 218 and safety switches 191, 166, 167 and 147. The opposite lead of the coil of up relay 192 is connected through limit switch 190 and lead 222 to a brush 144 bearing upon the third ring of the cable reel to which line 223 is soldered. Similarly, the opposite lead of the coil of down relay 193 is joined through lead 225 and limit switch 188 to brush 144, in engagement with the outer ring to which lead 224 is soldered. Conductor 225 which is joined to the down relay coil is also connected to terminal 226 of direction control switch 36. Similarly, lead 222 joined to the up relay coil is connected to contact 227 of switch 36. The movable contact member 228 of this switch is connected to lead 230 of transformer 231 the primary winding of which is connected across leads 211 and 207.

Lead 224 is joined to stationary contacts 232 and 233 of call switches 38. Lead 223 is connected to stationary contacts 234 and 235 of call switches 38. Movable contacts 236 and 237 of these call switches are connected to one lead of the secondary winding of step down transformer 187, the other lead of this secondary being grounded as at 238.

As long as all of the safety switches and limit switches are closed either the up or down relay can be closed by selectively actuating either direction switch 36 or one of the call switches 38. For example, suppose that a person, riding in a chair moving down the rail assembly, desires to immediately return to the upper floor. This is accomplished by manipulating direction control switch 36 so that movable contact 228 engages stationary contact 227. Shifting this movable contact deenergizes the coil of down relay 193 and causes the up relay coil to become energized. Consequently, the phase of the voltage applied to motor winding 194 is reversed and the carriage is driven in the reverse direction. When the carriage reaches the upper end of the track finger 240 of limit switch 190 strikes a projection mounted upon rail assembly 32 and causes switch 190 to open, deenergizing the up relay and stopping the operation of motor 33. In the same manner, when the carriage arrives at the lower end of the rail assembly, finger 241 of switch 188 strikes a projection carried by the rail and opens that switch to stop operation of the motor.

If an individual is at the bottom landing and the chair is at the top, he summons the car by manipulating the movable contact 237 of switch 38 disposed at the lower landing. Contact 237 is brought into engagement with stationary contact 233 so that the down relay coil is energized from transformer 187 through lead 224 the outer conductive ring, a contact brush 144, lead 225 and limit switch 188. The operation of the carriage drive, safety switches, brake, and governor are believed to be readily apparent from the previous description of their construction.

Having described my invention, I claim:

1. A chair lift comprising a rail assembly adapted to be mounted in a stairway, said rail assembly comprising a load rail and a leveling rail, a carriage mounted upon said rail assembly, a main shaft journalled in said carriage, a seat supporting frame pivotally mounted upon said main shaft, resilient driving rollers mounted upon said main shaft and in engagement with said load rail, a motor mounted upon said carriage in driving relationship with said resilient rollers, and leveling rollers mounted upon said frame in engagement with said leveling rail.

2. A chair lift comprising a rail assembly adapted to be mounted in a stairway, a carriage mounted upon said rail assembly, a motor for driving said carriage along said rail assembly, a step, means mounting said step upon said carriage whereby said step is shifted in a vertical plane when weight is applied to it, said step mounting means permitting transverse canting movement of said step when it strikes an obstruction, a switch in circuit controlling connection with the motor and having a finger disposed for actuation in response to the shifting of said step in either of said directions.

3. A chair lift comprising a rail assembly adapted to be mounted in a stairway, a carriage mounted upon said rail assembly, a seat supporting frame secured to said carriage and including a member having two elongated slots formed therein, a motor for driving said carriage along said rail assembly, a step, means mounting said step upon said frame, said means comprising a rod engaging said step and passing through said slots, spring means urging said rod forwardly within said slots, said step being shifted rearwardly when weight is applied to it, and pivoting whereby one end of said rod is shifted rearwardly when the seat strikes an obstruction, a switch in circuit controlling connection with said motor and having a finger disposed for actuation in response to the shifting of said step.

4. A chair lift comprising a rail assembly adapted to be mounted in a stairway, a carriage mounted upon said rail assembly, a seat supporting frame secured to said carriage, and including a member having two elongated slots formed therein, a seat mounted upon said frame, a motor for driving said carriage along said rail assembly, a step, a link interconnecting said step and said seat, a rod secured to a portion of said step disposed rearwardly of said link, and passing through said slots, two spaced mounting elements slideably engaging said frame and including arcuate portions engaging said rod, spring means urging said rod forwardly within said slots, said step being shifted rearwardly against said spring pressure when weight is placed upon the step and pivoting when said step strikes an obstruction whereby one end of said rod is shifted rearwardly within its slot, a switch mounted adjacent to each of said mounting elements, each of said switches being in circuit controlling relationship with said motor and having a finger disposed for contact with the arcuate portion of said mounting member.

5. A chair lift comprising a rail adapted to be mounted in a stairway, a carriage mounted upon said rail, a friction roller mounted upon said carriage in engagement with said rail, a motor mounted upon said carriage in driving relationship with said friction roller, a safety governor comprising a driving roller mounted upon said carriage in engagement with said rail, a shaft rotatable with said driving roller, a gripping member having an irregular periphery, said gripping member carrying an actuator bar, spring means normally maintaining said gripping member spaced from said rail, and pivotally secured dog means rotatable with said driving roller and adapted to be shifted outwardly by centrifugal force to strike said actuator forcing said gripping member into engagement with said rail.

6. A chair lift comprising a rail adapted to be mounted in a stairway, a carriage mounted upon said rail, a friction roller mounted upon said carriage in engagement with said rail, a motor mounted upon said carriage in driving relationship with said friction roller, a safety governor comprising a shaft, a driving roller secured to said shaft for rotation therewith, said driving roller being disposed in engagement with said rail, a gripping roller eccentrically mounted upon said shaft for rotation relative thereto, and having a knurled peripheral surface, an actuator bar carried by said gripping roller, spring means normally urging said gripping roller to a position free from engagement with said rail, a plate mounted upon said shaft, governor dogs pivotally mounted upon said plate, said dogs being rotatable outwardly by centrifugal force into engagement with said actuator bar, said dogs being effective to rotate said actuator bar and gripping roller to bring said gripping roller into engagement with said rail.

7. In a chair lift comprising a rail adapted to be mounted in a stairway, a carriage mounted upon said rail, a main shaft journalled on said carriage, a driving roller mounted upon said main shaft for frictional engagement with said rail, a motor mounted upon said carriage in driving relationship with said roller, a cable for supplying electric power to said motor, one end of said cable being secured adjacent to the upper end of said rail, the improvement which comprises a reel mounted upon an end of said main shaft and adapted to store said cable in a wound condition, means interconnecting said reel with said motor whereby said reel is driven to wind said cable when the carriage is moved upwardly along the rail, said means comprising a reel hub, bearing means for mounting said hub on said shaft, said hub having a hollow interior, a cam plate mounted on said shaft within said hub, a driving disc disposed within said hub and including a radial wall and a peripheral wall, said peripheral wall surrounding said cam plate, a plurality of balls interposed between said cam plate and driving disc, and a friction clutch plate disposed intermediate said driving plate and hub.

References Cited in the file of this patent

UNITED STATES PATENTS

| | | |
|---|---|---|
| 1,768,650 | Wood | July 1, 1930 |
| 2,212,388 | Cheney | Aug. 20, 1940 |
| 2,507,887 | Cheney | May 16, 1950 |
| 2,655,871 | Mazzola | Oct. 20, 1953 |